United States Patent [19]
Pierson

[11] Patent Number: 5,994,436
[45] Date of Patent: Nov. 30, 1999

[54] DUCTILE GAMMA RADIATION RESISTANT POLYOLEFIN COMPOSITION AND ARTICLES PRODUCED THEREFROM

[75] Inventor: Teresa A. Pierson, Newark, Del.

[73] Assignee: Montell North America Inc., Wilmington, Del.

[21] Appl. No.: 08/993,966

[22] Filed: Dec. 18, 1997

[51] Int. Cl.[6] .................................................. C08K 5/14
[52] U.S. Cl. ........................ 524/236; 524/99; 524/267
[58] Field of Search ................................. 524/267, 236, 524/99

[56] References Cited

U.S. PATENT DOCUMENTS

| | | | |
|---|---|---|---|
| 4,110,185 | 8/1978 | Williams et al. | 204/159.2 |
| 4,274,932 | 6/1981 | Williams et al. | 204/159.2 |
| 4,668,721 | 5/1987 | Seltzer et al. | 524/95 |
| 4,710,524 | 12/1987 | Donohue | 522/75 |
| 4,876,300 | 10/1989 | Seltzer et al. | 524/100 |
| 4,888,369 | 12/1989 | Moore, Jr. | 524/100 |
| 4,895,885 | 1/1990 | Foster et al. | 524/99 |
| 5,371,124 | 12/1994 | Cooke | 524/99 |
| 5,804,620 | 9/1998 | Amos | 524/99 |

FOREIGN PATENT DOCUMENTS

| | | |
|---|---|---|
| 0 343 717 B1 | 11/1989 | European Pat. Off. . |
| 0 664 315 A1 | 7/1995 | European Pat. Off. . |
| 0814128A1 | 12/1997 | European Pat. Off. . |
| 0867467A1 | 9/1998 | European Pat. Off. . |
| WO94/24344 | 10/1994 | WIPO . |

*Primary Examiner*—Melvyn I. Marquis
*Assistant Examiner*—Mark W. Milstead

[57] ABSTRACT

A ductile, gamma radiation resistant olefin polymer composition, including (a) an olefin in polymer, (b) an amount of N,N-dialkylhydroxylamine which is effective to increase the ductility of the composition, and (c) a polysiloxane which contains sterically hindered piperidino groups and which is present in an amount effective to increase the gamma radiation resistance of the composition. The composition may be used to manufacture sterilizable articles including food packaging and medical articles.

19 Claims, 4 Drawing Sheets

DUCTILE GAMMA RADIATION RESISTANT POLYOLEFIN COMPOSITION AND ARTICLES PRODUCED THEREFROM

BACKGROUND OF THE INVENTION

It is known to incorporate additives into articles made from olefin polymers to prevent fading and embrittlement over time due to exposure to UV radiation. For example, European Patent Publication No. 343,717 discloses the use of polysiloxanes containing sterically hindered piperidino groups to stabilize polyolefins against ultraviolet radiation and heat. There is no disclosure concerning stabilization against gamma radiation, which has a wavelength of $10^{-10}$ to $10^{-12}$ meter and is thus significantly more energetic than ultraviolet radiation having a wavelength of $10^{-6}$ to $10^{-7}$ meter.

It is also known to sterilize polyolefin articles with 2.5 to 5.0 megarads of high energy gamma radiation. However, polymeric articles exposed to such radiation typically suffer from discoloration and embrittlement, which can render them unfit for their intended use.

U.S. Pat. No. 5,371,124 provides a good summary of the various additives which have been proposed to enhance the radiation resistance of propylene polymer compositions prior to molding or shaping the polymer into a useful article. See also U.S. Pat. No. 4,888,369. However, any additive must be compatible with the other components of the polymer composition, and may cause other problems, including objectionable odor and/or color, processing difficulties, bleeding of the additive from the article over time, etc. See, for example, U.S. Pat. No. 4,710,524, which suggests that the inclusion of a mobilizing additive as described in U.S. Pat. Nos. 4,110,185 and 4,274,932 produces undesirable handling and imprinting problems.

Syringe grade material made from polypropylene is typically peroxide visbroken from a polymer having a low melt flow rate (MFR) to obtain a narrower molecular weight distribution and contains oil as a mobilizer to improve the free radical scavenging ability of a hindered amine light stabilizer additive. The polypropylene material typically also contains a sorbitol-based additive as a nucleator.

U.S. Pat. No. 4,876,300 discloses that long chain N,N-dialkylhydroxylamines can be used as process stabilizers for polyolefin compositions in order to minimize discoloration and melt flow rate increase due to extrusion. However, there is no recognition that such long chain N,N-dialkylhydroxylamines can also improve the ductility of a polyolefin composition which has been subjected to high energy gamma radiation.

U.S. Pat. No. 4,668,721 broadly discloses that hydroxylamine derivatives may be used to stabilize polyolefin compositions against degradation due to extrusion, exposure to the combustion products of natural gas, gamma radiation or upon storage for extended periods. The hydroxylamine derivative may have a chemical structure which conforms to one of fourteen structural formulae. Although data is presented for processing stability, resistance to gas fading and resistance to discoloration due to oven aging, no data is presented concerning gamma irradiation. Moreover, almost all of the data is directed to polyolefin compositions stabilized with N,N-dibenzylhydroxylamine; the only dialkylhydroxylamine evaluated was N,N-di-n-octylhydroxylamine.

Recently, European Patent Publication No. 664,315 proposed the use of mobilizing oil and a polysiloxane ether of a hindered piperidine to stabilize polypropylene against sterilizing radiation. There is no disclosure regarding the addition of a N,N-dialkylhydroxylamine to improve ductility of the propylene composition.

An object of the present invention is to provide a ductile polymer composition which can be easily injection molded into flexible, substantially transparent articles.

Another object of the present invention is to provide a gamma radiation resistant polymer composition which is particularly resistant to yellowing.

BRIEF SUMMARY OF THE INVENTION

In one aspect, the present invention relates to an olefin polymer composition, comprising:

(a) an olefin polymer, (b) an amount of N,N-ialkylhydroxylamine which is effective to increase the ductility of the composition, and (c) a polysiloxane which contains sterically hindered piperidino groups and which is present in an amount effective to increase the gamma radiation resistance of the composition.

In another aspect, the present invention relates to a sterilizable article in which at least part of the material construction thereof comprises an olefin polymer composition comprising:

(a) an olefin polymer, (b) an amount of N,N-dialkylhydroxylamine which is effective to increase the ductility of the composition, and (c) a polysiloxane which contains sterically hindered piperidino groups and which is present in an amount effective to increase the gamma radiation resistance of the composition.

DETAILED DESCRIPTION OF THE PREFERRED EMBODIMENTS

As summarized above, the present invention relates to an olefin polymer composition which includes:

(a) an olefin polymer, (b) an amount of N,N-dialkylhydroxylamine which is effective to increase the ductility of the composition, and (c) a polysiloxane which contains sterically hindered piperidino groups and which is present in an amount effective to increase the gamma radiation resistance of the composition. The inventor has unexpectedly discovered that a combination of the N,N-dialkylhydroxylamine and the polysiloxane imparts superior ductility, discoloration resistance and oxidation resistance to a olefin polymer.

The N,N-dialkylhydroxylamine must have a hydroxyl group bonded to the nitrogen atom, and preferably conforms to the formula:

wherein $R_1$ and $R_2$ are independently $C_{1-36}$ alkyl, which is unsubstituted or substituted with hydroxyl. Illustrative hydroxylamines which come within the above formula include N,N-distearylhydroxylamineand di(hydrogenated tallow)amine.

A typical di(hydrogenatedtallow)amine has the following distribution of alkyl substituents:

| $R_1R_2NH$ | | |
|---|---|---|
| $R_1$ | $R_2$ | % |
| $C_{16}$ | $C_{14}$ | 1.9 |
| $C_{16}$ | $C_{16}$ | 12.4 |
| $C_{16}$ | $C_{17}$ | 2.8 |
| $C_{16}$ | $C_{18}$ | 36.0 |
| $C_{17}$ | $C_{18}$ | 3.9 |
| $C_{18}$ | $C_{18}$ | 39.0 |
| Other | | 4.0 |

The di(hydrogenated tallow)amine originating from animal sources may well vary somewhat in the specific distribution of alkyl substituents, but the di(hydrogenated tallow) amine contains major amounts of N,N-dihexadecylamine, N,N-dioctadecylamine and N-hexadecyl-N-octadecylamine. The individual components of the mixture can be separated by distillation under high vacuum.

However, for the purposes of this invention, there is no need to carry out such separation and the hydroxylamine prepared from the di(hydrogenated tallow)amine is a preferred embodiment of the present invention.

The long chain N,N-dialkylhydroxylamines can be prepared by a number of methods. These include (a) the oxidation of the corresponding secondary amine with aqueous hydrogen peroxide to form the desired N,N-dialkylhydroxylamine directly; (b) the addition of the secondary amine to an alpha, beta-unsaturated compound such as an alkyl acrylate to form a Michael addition product, which is in turn oxidized to the corresponding tertiary amine oxide using aqueous hydrogen peroxide, and followed by the elimination of the alpha,-beta-unsaturated compound by the Cope reaction to give the N,N-dialkylhydroxylamine; (c) the metathesis reaction between an alkyl halide and a hydroxylamine in the presence of alkali such as sodamide; and (d) the reaction of an amine with a peroxy compound, such as benzoyl peroxide, followed by saponification of the intermediate formed to the desired hydroxylamine derivative.

The N,N-dialkylhydroxylamine should be present in an amount which is effective to increase the ductility of the olefin polymer. For polypropylene, the N,N-dialkylhydroxylamine is typically present in an amount of from 0.01 to 5.0 weight percent, preferably from 0.1 to 0.5 weight percent, based on the weight of the olefin polymer.

The polysiloxane which contains sterically hindered piperidino groups preferably conforms to the formula:

(I)

wherein $R_1$ and $R_3$ are independent linear or branched $C_{1-10}$ alkyl radicals, $C_{5-11}$ cycloalkyl radicals or phenyl radicals;

$R_2$ is a radical which conforms to one of the following formulae II–IV.

(II)

in which:

$R_4$ is hydrogen or methyl or benzyl;

$R_5$ is a linear or branched $C_1$–$C_7$ alkyl radical;

z is a group chosen from:

—O—;

where $R_7$ is a linear or branched $C_1$–$C_5$ alkyl group or hydrogen;

$R_6$ is hydrogen or methyl;

q is zero or one;

n is a whole number;

m and p, which can be the same or different, are zero or whole numbers, with the proviso that n+p+m is a whole number less than or equal to 50;

A is a group corresponding to the formula:

(III)

where $R_1$ has the aforesaid meaning;

B is a group corresponding to the formula:

(IV)

where $R_1$ has the aforesaid meaning; or A and B jointly represent a direct bond, giving rise to a cyclic structure.

The polysiloxane stabilizers corresponding to formula (I) are polymers having random distribution of the monomer units and a linear or cyclic structure.

In particular, they assume a linear structure when A and B are groups corresponding to formulas (III) and (IV), whereas they assume a cyclic structure when A and B jointly represent a direct bond.

A preferred polysiloxane which comes within the above formula is polymethyl propyl 3-oxy-[4-(2,2,6,6-tetramethyl) piperidinyl]siloxane, which is commercially available under the Uvasil 299 trademark from the Great Lakes Chemical Corporation.

The olefin polymer is derived from monoolefins, such as polyethylene, which can be crosslinked, polypropylene, polyisobutylene, polybutene-1, poly-3-methylbutene-1 and poly-4-methylpentene-1. Polyethylene may be for example medium density, high density or linear low density polyethylene.

Mixtures of the homopolymers cited above, for example mixtures of polypropylene and polyethylene, polypropylene and polybutene-1, or polypropylene and polyisobutylene and the like, may also be used.

Copolymers of monoolefins may also be used in the instant compositions, for example ethylene/propylene copolymers, propylene/butene-1 copolymers, propylene/octene-1 copolymers, ethylene/butene-1 copolymers, ethylene/octene-1 copolymers as well as ethylene/vinyl acetate copolymers.

The saturated olefin polymer is preferably a propylene polymer, most preferably either a crystalline propylene homopolymer having an isotactic index greater than 90 or a crystalline, random copolymer of propylene and either ethylene or $C_4$–$C_{10}$ 1-olefins. The propylene polymer is preferably visbroken to a MFR of 11–15 g/10 minutes. Such propylene polymers are commercially available from Montell North America, Inc.

The polymer composition may also include a second stabilizer additive in an amount effective to increase the resistance of the olefin polymer to yellowing. The second stabilizer additive is preferably at least one stabilizer selected from the group consisting of a phosphite, a phosphonite and a hindered amine. Illustrative phosphites include tris(2,4-di-tert.-butylphenyl)phosphite; 2,2',2"-nitrilo triethyl-tris[3,3',5',5"-tetra-tert.-butyl 1,1'-biphenyl 2,2 dyl]phosphite; and bis[2,4-bis(1,1-dimethylethyl)-6-methylphenyl]ethyl ester of phosphorous acid. Illustrative hindered amines include bis(2,2,6,6-tetramethylpiperidin-4-yl) sebacate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis-(amino-2,2,6,6-tetramethylpiperidine) or N,N',N",N'"-tetrakis[(4,6-bis(butyl-(2,2,6,6-tetramethyl-piperidin-4-yl) amino)-s-triazine-2-yl]-1,10-diamino-4,7-diazadecane.

The polymer composition may also include at least one acid neutralizing agent selected from the group consisting of metal soaps, hydrotalcites, lactates, aluminum silicate, calcium and oxides and hydroxides of Group II metals. Calcium stearate and sodium stearate are preferred.

The polymer composition may also include at least one sorbitol-based nucleator selected from the group consisting of bis-(3,5-dimethylbenzylidene) sorbitol; (1,3)2,4-di(p-methylbenzylidene) sorbitol; p-ethylbenzylidene sorbitol; and 2,4-dimethylbenzylidene sorbitol.

The polymer composition of the present invention may be prepared by mixing an olefin polymer in flake or particle form, the hydroxyl-substituted tertiary amine and the polymethyl propyl 3-oxy-[4-(2,2,6,6-tetramethyl) piperidinyl] siloxane in a conventional mixing apparatus.

The polymer composition of the present invention is particularly suitable for injection molding into articles which will be sterilized by gamma irradiation, including food packaging and medical articles, such as syringe barrels, syringe plungers, tubing, tube assemblies, forceps, surgical clamps, tissue culture tubes, and fibers for surgical gowns.

EXAMPLES

The following Examples describe preferred embodiments of the ductile, gamma radiation resistant propylene polymer composition of the invention, and are presented for illustrative purposes only. Unless otherwise specified, all quantities of ingredients are in pph of the propylene polymer material except, of course, for the propylene polymer material.

General Procedures

The following procedures were used to prepare and evaluate the compositions set forth in the following Examples.

The components of each sample composition, which were in finely divided condition, were mixed in a Henschel mill for one minute and low speed and 30 seconds at high speed. Lupersol 101 was added to all lots to achieve an 11–15 dg/minute melt flow rate. The mixture was then extruded at 500° F. and 125 rpm in a Haake counter-rotating, intermeshing twin screw extruder in an air atmosphere. The resulting blend was extruded as a strand, cooled in water, and pelletized.

The sample pellets were then extruded at 400° F. and 75 rpm through a nine inch wide die maintained at 425° F. into a 40 mil thick sheet in air. The extruded sheet was cut into 3.5"×3.5" squares, which were then tested for melt flow rate, radiation resistance, and high impact resistance as disclosed below.

The melt flow rate of all samples (pellet and sheet, non-irradiated and irradiated) was determined according to ASTM D1238, Condition L. The melt stability of the samples was determined on a Kayeness Plastometer.

The radiation resistance of the sheet samples was tested by packaging samples in plastic bags, with pieces of paper inserted between individual sheets to permit air circulation. These samples were then irradiated with either a 3 or 5 megarad cobalt 60 gamma radiation dose at an exposure rate of approximately 1.0 megarad/hour in air.

The discoloration suffered by the samples was measured according to the Yellowness Index according to ASTM D 1925 using a Hunter Lab Colorimeter.

All sheet samples, having a radiation exposure of 0, 3 or 5 megarads, were aged in a 60° C. (140° F.) forced air oven. After specified periods of aging, samples were withdrawn and tested for impact resistance by means of a Rheometrics high rate impact test discussed below. If a entire sample lot suffered catastrophic failure before the end of the test period, it was withdrawn from the oven and testing was discontinued for that sample.

The impact resistance of the sample sheet squares was tested according to ASTM D3763 using a Rheometrics High Rate Impact Tester RIT-8000. Samples were tested at 0.01 m/sec. using a 0.5" dart and a 2.5" back ring at room temperature. The energy and force required to puncture the sample and the distance (millimeters) travelled by the tup. The manner of the break was recorded as either ductile or brittle.

Ductility value is the ductility ratio (the total energy reading divided by the ultimate energy reading) multiplied by the ductility factor (the value assigned to the number of ductile breaks in each lot). The ductility factor in turn depends on the number of total plaques tested in each lot for each time period; i.e. if 4 plaques are tested, and all are ductile, the ductility factor is "10". Three ductile breaks,the factor is "7.5"; two ductile breaks, "5.0"; one ductile break, "2.5". If there are no ductile breaks, the ductility factor is "0", which also gives a ductility value of "0". (Two "0" readings in consecutive testing for one lot signifies total failure, and no further testing is performed). Traditionally, testing has relied only on the ductility ratio, in which a value of "1" was considered to show the sample as brittle. Over three years of testing in this manner have shown, however, that the ductility ratio can be misleading and not true to the actual ductility or brittleness of a particular sample. Ductility value compensates for this by bringing the actual physical evidence of the manner of the break into the equation—the higher the value, the more ductile the sample. The point of total brittleness is also clearly defined—when the ductility value is "0", the sample is considered brittle, despite what the ductility ratio alone indicates.

Example 1

A base polypropylene formulation was used to prepare all sample compositions. The base formulation comprised PH 180 propylene polymer commercially available from Montell North America, Inc. and 0.05 pph calcium stearate, and was mixed with differing amounts of the additives listed below, visbroken with Lupersol 101, extruded into sheet and evaluated for ductility value, both initially and after 1 week of oven aging at 60° C. (140° F.):

TABLE 1

| | | Ductility Value at 0 Megarads | |
|---|---|---|---|
| No. | Additive | Init. | 1 Wk. |
| I-4 | 0.1 pph FS-042<br>0.125 pph Uvasil 299 | 15.9 | 13.3 |
| I-2 | 0.3 pph FS-042 | 18.4 | 14.3 |
| I-3 | 0.5 pph FS-042 | 18.7 | 17.5 |
| I-5 | 0.5 pph FS-042<br>0.125 pph Uvasil 299 | 19.2 | 13.4 |
| I-6 | 0.5 pph FS-042<br>0.125 pph Uvasil 299<br>4.7 pph oil | 19.7 | 15.9 |
| I-7 | 0.5 pph FS-042<br>0.2 pph Chimassorb 944 | 19.8 | 14.6 |
| I-8 | PF-091B | 15.7 | 12.8 |
| I-1 | 0.1 pph FS-042 | 16.5 | 14.95 |

Notes:
FS-042 is a trademark for a product containing N,N-di(stearyl)hydroxylamine which is commercially available from Ciba.
Uvasil 299 is a trademark for a product containing polymethyl propyl 3-oxy-[4-(2,2,6,6-tetramethyl)piperidinyl] siloxane, which is commercially available from the Great Lakes Chemical Corporation.
Chimassorb 944 is a trademark for a product containing poly[[6-[(1,1,3,3-tetramethyl-butyl)amino]-s-triazine-2,4-diyl][2,2,6,6-tetramethyl-4-piperidyl)imino]hexamethylene[(2,2,6,6-tetramethyl-4-piperidyl)imino]], which is commercially available from Ciba.
PF-091B has the following formulation: PH 180 visbroken, 0.12 pph Tinuvin 770 hindered amine stabilizer 0.05 pph sodium stearate, Lupersol 101 peroxide to the desired MFR.

Figure 1:
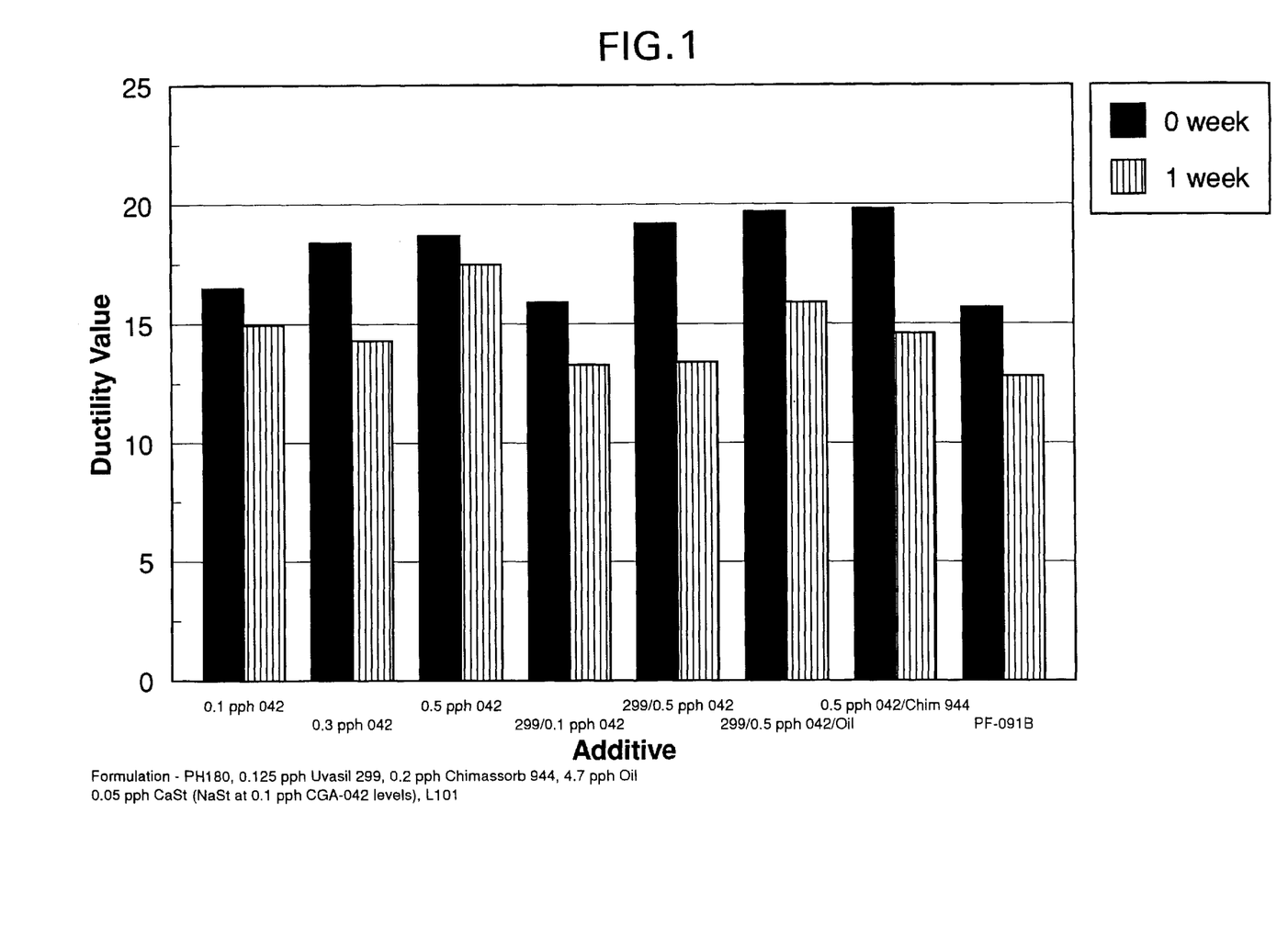
FIGS. 1–3 are graphs of ductility values of different polyolefin film samples measured after different periods of oven aging at 60° C. after having been exposed to 0, 3 and 5 Mrad of cobalt 60 gamma radiation, respectively.

The ductility results listed in Table 1 above are graphically illustrated in FIG. 1. An increase in initial ductility (Week 0) is seen in Sample Nos. I-1 through I-3 as the amount of N,N-distearylhydroxyl amine is increased. A further increase in initial ductility is achieved by the addition of polymethyl propyl 3-oxy-[4-(2,2,6,6-tetramethyl) piperidinyl]siloxane alone (Sample I-5), and together with a hydrocarbon oil (Sample I-6). The combination of N,N-distearylhydroxylamine and the siloxane results in decreased ductility after one week of oven aging.

Other sheets of the above formulations were exposed to 3 megarads of gamma radiation, and were measured for ductility value after various periods of oven aging at 60° C. (140° F.):

TABLE 2

| | | Ductility Value at 3 Megarads | | | |
|---|---|---|---|---|---|
| No. | Additive | Init. | 2 Wk | 4 Wk | 8 Wk |
| I-4 | 0.1 pph FS-042<br>0.125 Uvasil 299 | 14.0 | 18.6 | 6.4 | 5.2 |
| I-2 | 0.3 pph FS-042 | 17.1 | 10.3 | 14.0 | 7.1 |
| I-3 | 0.5 pph FS-042 | 12.8 | 7.8 | 10.8 | 8.7 |
| I-5 | 0.5 pph FS-042<br>0.125 Uvasil 299 | 18.8 | 14.1 | 12.9 | 15 |
| I-6 | 0.5 pph FS-042<br>0.125 pph Uvasil 299<br>4.7 pph oil | 18.2 | 14.0 | 14.0 | 8 |
| I-7 | 0.5 pph FS-042<br>0.2 pph Chimassorb 944 | 18.7 | 15.7 | 13.9 | 15.7 |
| I-8 | PF-091B | 12.3 | 0 | 0 | 0 |
| I-1 | 0.1 pph FS-042 | 14.8 | 11.6 | 8.0 | 0 |

Figure 2:
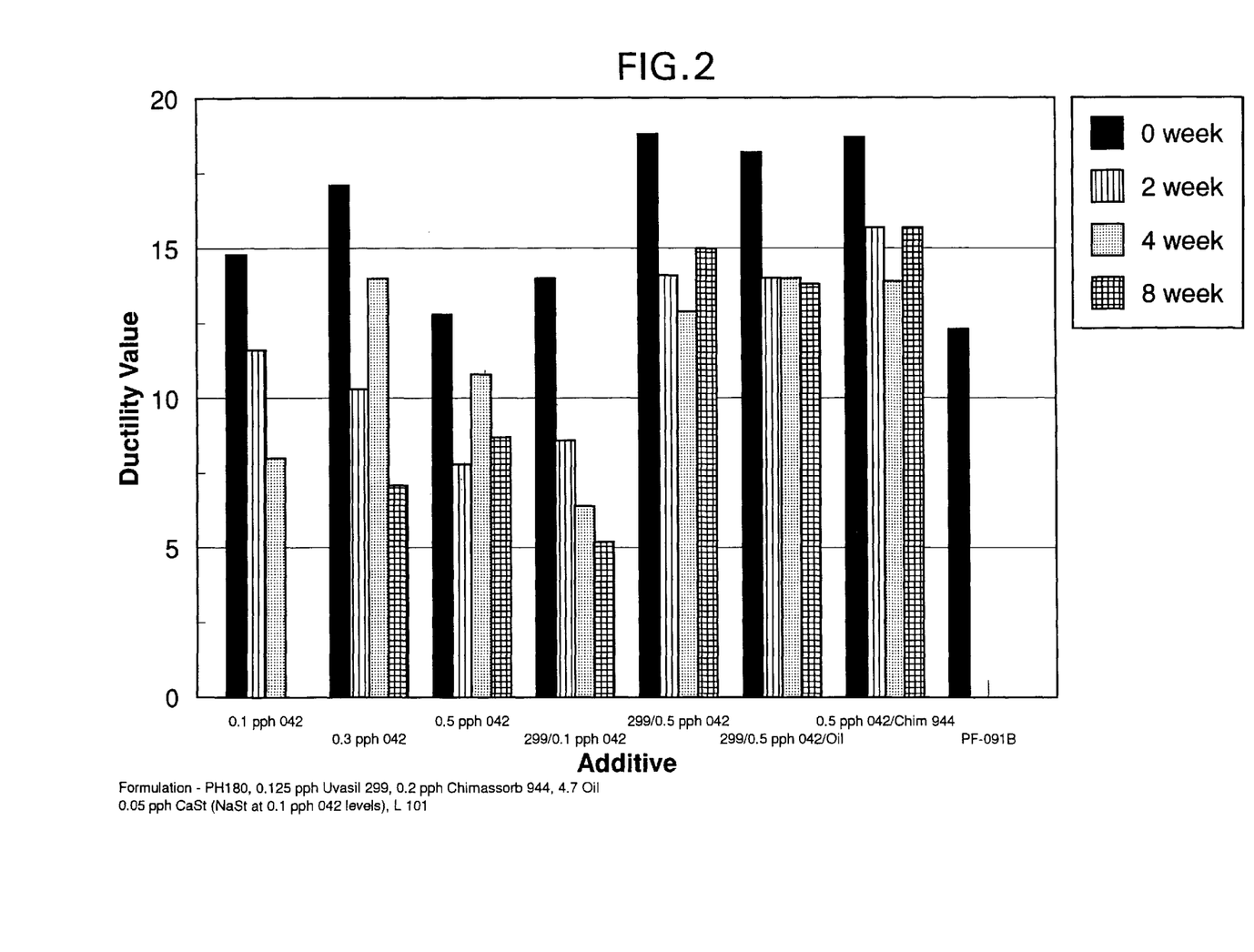

The ductility results listed in Table 2 above are graphically illustrated in FIG. 2. The combination of N,N-distearylhydroxyl amine and the siloxane (Sample I-5) exhibits the highest initial ductility and maintains one of the highest ductility values at weeks 2, 4 and 8 of oven aging.

Other sheets of the above formulations were subjected to 5 megarads of gamma radiation, and were measured for ductility value after various periods of oven aging at 60° C. (140° F.):

TABLE 3

| | | Ductility Value at 5 Megarads | | | |
|---|---|---|---|---|---|
| No. | Additive | Init. | 2 Wk | 4 Wk | 8 Wk |
| I-4 | 0.1 pph FS-042<br>0.125 pph Uvasil 299 | 13.1 | 0 | 0 | 0 |
| I-2 | 0.3 pph FS-042 | 17.6 | 2.8 | 5.9 | 0 |
| I-3 | 0.5 pph FS-042 | 18.0 | 15.5 | 10.5 | 14.1 |
| I-5 | 0.5 pph FS-042<br>0.125 pph Uvasil 299 | 18.8 | 11.3 | 13.8 | 10.3 |
| I-6 | 0.5 pph FS-042<br>0.125 pph Uvasil 299<br>4.7 pph oil | 16.6 | 13.7 | 14.1 | 13.4 |
| I-7 | 0.5 pph FS-042<br>0.2 pph Chimassorb 944 | 7.3 | 16.3 | 16.5 | 14.2 |
| I-8 | PF-091B | 5.65 | 0 | 0 | 0 |
| I-1 | 0.1 pph FS-042 | 13.57 | 0 | 0 | 0 |

Figure 3:
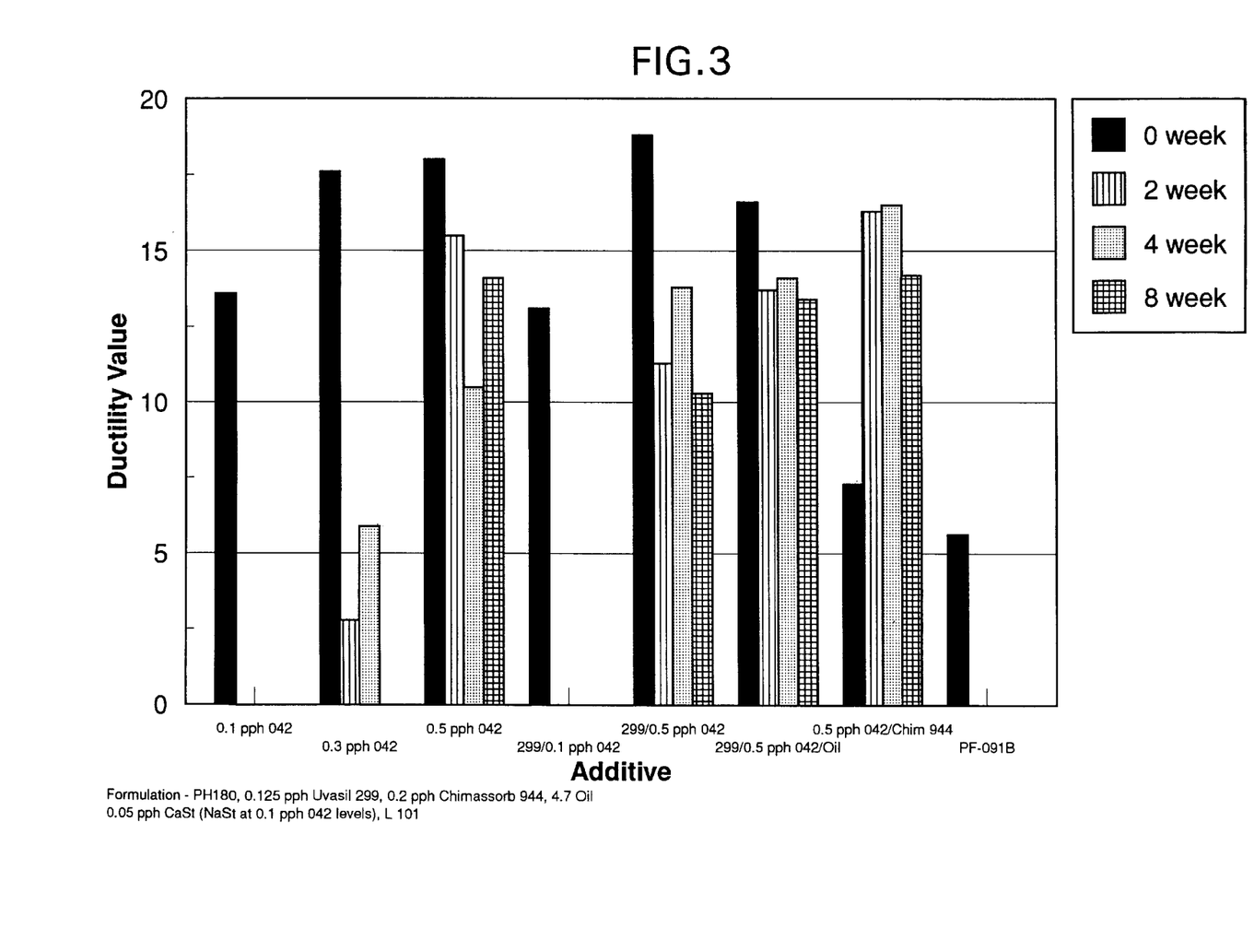

The ductility results listed in Table 3 above are graphically illustrated in FIG. 3. The combination of N,N-distearylhydroxyl amine and the siloxane (Sample I-5) exhibits the highest initial ductility and maintains one of the highest ductility values at weeks 2, 4 and 8 of oven aging.

Example 2

The yellowness index of the above formulations were measured after extrusion into sheet, and after the extruded sheet had been cut into 3.5"×3.5" samples and exposed to 3 and 5 Mrad of cobalt 60 gamma radiation:

TABLE 4

| | | Yellowness Index | | |
|---|---|---|---|---|
| No. | Additive | Init. | 3 Mrad | 5 Mrad |
| I-1 | 0.1 pph FS-042 | 2.1 | 2.6 | 2.6 |
| I-2 | 0.3 pph FS-042 | 2.4 | 2.8 | 2.9 |

TABLE 4-continued

| No. | Additive | Init. | 3 Mrad | 5 Mrad |
|---|---|---|---|---|
| I-3 | 0.5 pph FS-042 | 2.4 | 3.1 | 3.2 |
| I-5 | 0.5 pph FS-042 0.125 pph Uvasil 299 | 2.3 | 2.9 | 2.97 |
| I-6 | 0.5 pph FS-042 0.125 pph Uvasil 299 4.7 pph oil | 2.4 | 3.1 | 3.2 |
| I-7 | 0.5 pph FS-042 0.2 pph Chimassorb 944 | 2.7 | 2.9 | 3.2 |
| I-8 | PF-091B | 1.8 | 2.2 | 2.65 |
| I-4 | 0.1 pph FS-042 0.125 pph Uvasil 299 | 2.2 | 2.9 | 2.70 |

Figure 4:
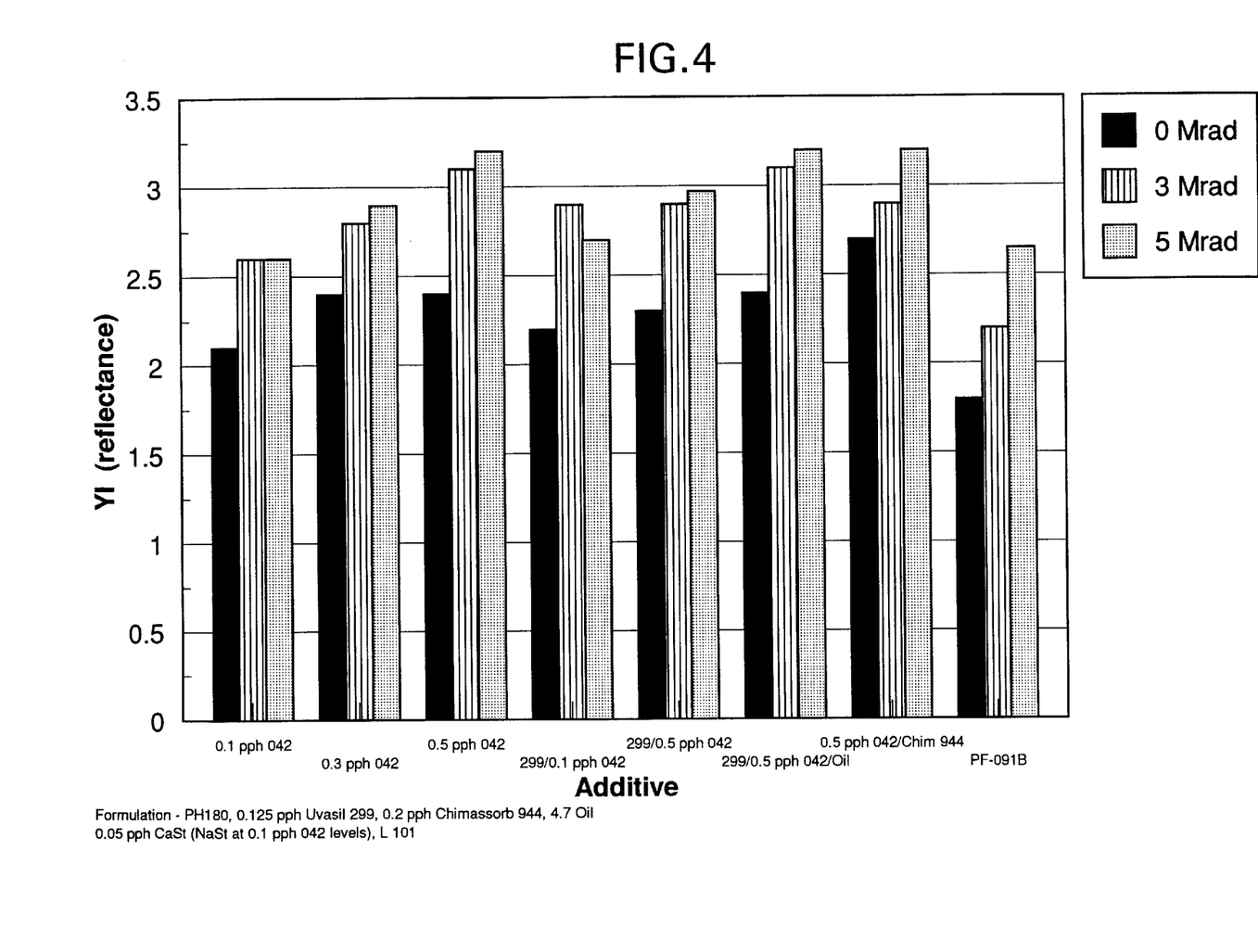
FIG. 4 is a graph of the yellowness index of various polyolefin pellet and sheet samples which have been exposed to 0, 3 and 5 Mrad of cobalt 60 gamma radiation.

The yellowness index data listed in Table 4 above are graphically illustrated in FIG. 4. The composition containing a combination of polysiloxane and N,N-distearylhydroxylamine (Sample I-5) exhibited less yellowing than a corresponding composition containing only N,N-distearylhydroxylamine (Sample I-3), or a composition containing N,N-distearylhydroxylamine and a conventional hindered amine light stabilizer (Sample I-7).

Example 3

A base polypropylene formulation was used to prepare the comparative sample composition discussed below. The base formulation comprised PH 180 propylene polymer commercially available from Montell USA Inc. and 0.05 pph calcium stearate. The base formulation was mixed with 0.05 pph calcium stearate, 0.50 pph of FS-042 N,N-distearyl hydroxylamine and 0.125 pph of a conventional (non-polysiloxane) hindered amine, and was visbroken with sufficient Lupersol 101 to raise the melt flow rate of the composition to 12 g/10 min. The formulation was extruded into sheet and evaluated for ductility values at 3 and 5 Mrads. The results are shown in Table 5 below:

TABLE 5

| Formulation | Ductility Value | | |
|---|---|---|---|
| | Init. | 3 Mrad | 5 Mrad |
| 100 pph PH 180 0.50 pph FS-042 0.125 pph Chimassorb 944 As req'd Lupersol-101 | 20.04 | 18.76 | 18.40 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A ductile, gamma radiation resistant olefin polymer composition, comprising:
   (a) an olefin polymer,
   (b) an amount of N,N-dialkylhydroxylamine which is effective to increase the ductility of the composition, and
   (c) a polysiloxane which contains sterically hindered piperidino groups and which is present in an amount effective to increase the gamma radiation resistance of the composition.

2. The polymer composition of claim 1, wherein said N,N-dialkylhydroxylamine conforms to the formula:

$$R_1R_2NOH$$

wherein $R_1$ and $R_2$ are independently $C_{1-36}$ alkyl, which is unsubstituted or substituted with hydroxyl.

3. The polymer composition of claim 2, wherein said N,N-dialkylhydroxylamine is N,N-distearylhydroxylamine.

4. The polymer composition of claim 2, wherein said N,N-dialkylhydroxylamine comprises di(hydrogenatedtallow) hydroxylamine.

5. The polymer composition of claim 1, wherein said N,N-dialkylhydroxylamine is present in an amount of from 0.01 to 5.0 weight percent, based on the weight of the olefin polymer.

6. The polymer composition of claim 5, wherein said N,N-dialkylhydroxylamine is present in an amount of from 0.1 to 0.5 weight percent, based on the weight of the olefin polymer.

7. The polymer composition of claim 1, wherein said polysiloxane conforms to the formula:

(I)

wherein $R_1$ and $R_3$ are independent linear or branched $C_{1-10}$ alkyl radicals, $C_{5-11}$ cycloalkyl radicals or phenyl radicals;

$R_2$ is a radical which conforms to one of the following formulae II–IV:

(II)

in which:

$R_4$ is hydrogen or methyl or benzyl;

$R_5$ is a linear or branched $C_1$–$C_7$ alkyl radical;

Z is a group chosen from:

—O— or where $R_7$ is a linear or branched $C_1$–$C_5$ alkyl group or hydrogen;

$R_6$ is hydrogen or methyl;

q is zero or one;

n is a whole number;

m and p, which can be the same or different, are zero or whole numbers, with the proviso that n+p+m is a whole number less than or equal to 50;

A is a group corresponding to the formula:

(III)

where $R_1$ has the aforesaid meaning;

B is a group corresponding to the formula:

(IV)

where $R_1$ has the aforesaid meaning;

or A and B jointly represent a direct bond, giving rise to a cyclic structure.

8. The polymer composition of claim 7, wherein said polysiloxane is polymethyl propyl 3-oxy-[4-(2,2,6,6-tetramethyl)piperidinyl]siloxane.

9. The polymer composition of claim of claim 1, wherein said olefin polymer is either a crystalline propylene homopolymer having an isotactic index greater than 90 or a crystalline, random copolymer of propylene and either ethylene or $C_4$–$C_{10}$ 1-olefins.

10. The polymer composition of claim 1, wherein said olefin polymer has a melt flow rate of 11–15 g/10 minutes.

11. The polymer composition of claim 1, further comprising a second stabilizer additive in an amount effective to increase the resistance of the olefin polymer to yellowing, said second stabilizer comprising at least one stabilizer selected from the group consisting of a phosphite, a phosphonite and a hindered amine.

12. The polymer composition of claim 11, wherein said phosphite is at least one member selected from the group consisting of tris(2,4-di-tert.-butylphenyl)phosphite; 2,2',2"-nitrilo triethyl-tris[3,3',5',5"-tetra-tert.-butyl 1,1'-biphenyl 2,2dyl]phosphite; and bis[2,4-bis(1,1-dimethylethyl)-6-methylphenyl]ethyl ester of phosphorous acid.

13. The polymer composition of claim 11, wherein said hindered amine is at least one member selected from the group consisting of bis(2,2,6,6-tetramethylpiperidin-4-yl) sebacate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis-(amino-2,2,6,6-tetramethylpiperidine) or N,N',N",N'"-tetrakis[(4,6-bis(butyl-(2,2,6,6-tetramethyl-piperidin-4-yl) amino)-s-triazine-2-yl]-1,10-diamino-4,7-diazadecane.

14. The polymer composition of claim 1, further comprising at least one acid neutralizing agent selected from the group consisting of metal soaps, hydrotalcites, lactates, aluminum silicate, calcium and oxides and hydroxides of Group II metals.

15. The polymer composition of claim 1, further comprising at least one sorbitol-based compound selected from the group consisting of bis-(3,5-dimethylbenzylidene) sorbitol; (1,3)2,4-di(p-methylbenzylidene) sorbitol; p-ethylbenzylidene sorbitol; and 2,4-dimethylbenzylidene sorbitol.

16. A ductile, gamma radiation resistant olefin polymer composition prepared by mixing:

(a) an olefin polymer, (b) an amount of N,N-dialkylhydroxylamine which is effective to increase the ductility of the composition, (c) an amount of polymethyl propyl 3-oxy-[4-(2,2,6,6-tetramethyl)piperidinyl]siloxane which is effective to increase the gamma radiation resistance of the composition.

17. A sterilizable article in which at least part of the material construction thereof comprises the polymer composition of claim 1.

18. The sterilizable article of claim 17, wherein said article is selected from the group consisting of syringe barrels, syringe plungers, tubing, tube assemblies, forceps, surgical clamps, tissue culture tubes, and fibers for surgical gowns.

19. A sterilized article in which at least part of the material construction thereof comprises the polymer composition of claim 1.

* * * * *

UNITED STATES PATENT AND TRADEMARK OFFICE
CERTIFICATE OF CORRECTION

PATENT NO.    : 5,994,436
DATED         : November 30, 1999
INVENTOR(S)   : Teresa A. Pierson It is certified that error appears in the above-identified patent and that said Letters Patent is hereby corrected as shown below:

Abstract,
Line 2, delete --in-- after the word "olefin"

Column 2,
Line 15, chsnge "N, N-iakylhydroxylamine" to --N, N-dialkylhydroxylamine--

Column 4,
Line 6, change the final subscript "$_2$" at the upper end of Formula (II) to --$_q$--

Column 10,
Line 42, change the final subscript "$_2$" at the upper end of Formula (II) to --$_q$--

Signed and Sealed this

Seventeenth Day of July, 2001

*Attest:*

NICHOLAS P. GODICI
*Attesting Officer*    *Acting Director of the United States Patent and Trademark Office*